Feb. 9, 1971 W. I. PONTIUS ET AL 3,561,979
PREPARATION OF SHORTENING DRIED EGG PRODUCTS
Filed June 30, 1966
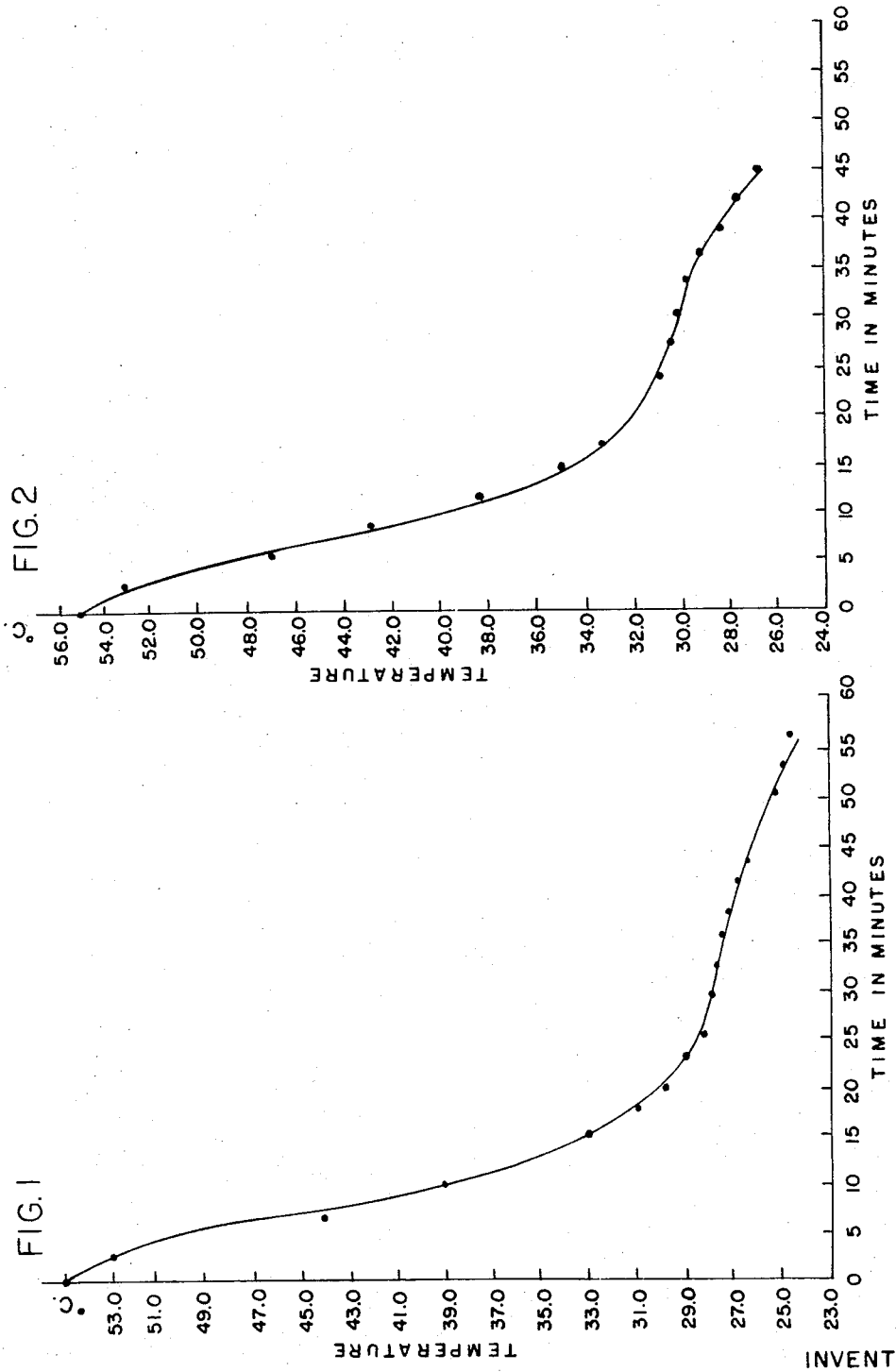
INVENTORS:
WILLIAM I. PONTIUS
JOSEPH G. ENDRES
LEON A. VAN AKKEREN
BY
*Carl C. Batz*
ATT'Y United States Patent Office 3,561,979
Patented Feb. 9, 1971

3,561,979
PREPARATION OF SHORTENING DRIED
EGG PRODUCTS
William I. Pontius, Western Springs, Joseph G. Endres,
Downers Grove, and Leon A. Van Akkeren, Lombard,
Ill., assignors to Armour and Company, Chicago, Ill., a
corporation of Delaware
Filed June 30, 1966, Ser. No. 561,883
Int. Cl. A23l 1/32
U.S. Cl. 99—113
13 Claims

ABSTRACT OF THE DISCLOSURE

A method for preparing a plastic shortening-dried egg product having improved functional properties useful in baking.

This invention relates to the preparation of shortening-dried egg products. The invention is particularly useful in preparing a shortening in which dried whole eggs, dried egg yolks, dried egg whites, and combinations thereof are incorporated into a shortening. The egg material may be processed in any of a number of ways and may or may not be pasteurized or processed to destroy Salmonella or other microorganisms and may or may not be processed with carbohydrates or other additives.

Dried whole eggs or egg yolks, etc., as, for example, spray dried egg material, from a dry powdery body which can be mixed with water only after a time-consuming and tedious operation. The powdery material floats on the water and the bakers lose a substantial amount of time in bringing about a mixing of the water and egg material so that the egg becomes reconstituted.

The American Institute of Baking Bulletin No. 115, dated November 1965, points out that dried egg solids are not the equivalent of liquid eggs until they have been rehydrated and requires that the liquid be introduced early into the mixing procedure so that the egg solids will become hydrated by the end of the mixing time, and setting out the admonition: "Avoid coating particles of egg solids with fat before liquid is added."

We have discovered that dried egg solids can be incorporated effectively in animal and vegetable shortenings in an anhydrous or low-moisture system and that the shortening can be then rapidly added to the dry constituents of the cake or other baked product so that the time-consuming, pre-mixing step heretofore required in the use of dried eggs can be eliminated. Further, we find that the shortening protects the dried egg from and flavor deterioration and also protects the dried egg material from loss of functionality in baking operations.

An object of our invention, therefore, is to prepare a shortening-dried egg product having new and important properties. A further object is to provide a process for preparing shortening and dried egg blends which eliminate the need for pre-mixing of the powdered egg with water. Yet another object is to provide a shortening-dried egg product in which the dried egg is protected against loss of color and flavor and loss of functionality. Other specific objects and advantages will appear as the specification proceeds.

In one embodiment of our invention, we prepare a shortening-dried egg product by first providing a shortening formula which, when combined with dried eggs, is effective in minimizing the rate of heats of crystallization and/or transition in the range where the cooling curve of the shortening-dried egg product exhibits its dominant reduced rate of temperature change with time, and, secondly, employing processing conditions followed by tempering conditions to stabilize the performance of the shortening-dried egg product.

In the shortening formulation procedure, we prefer a shortening composed of animal fats or vegetable fats or combinations thereof, the formulation being such that the shortening egg product has a characteristic cooling curve. The cooling curve shows a continuous fall in temperature, with a decreased rate of drop in temperature in the range of about 32–24° C., and with a drop in such range unbroken by plateaus and temperature rises in excess of 1° C.

In the accompanying drawing, the cooling curve for an animal shortening-dried egg product is shown in FIG. 1, and the cooling curve for a vegetable shortening-dried egg product is shown in FIG. 2. It will be noted that the temperature drops rapidly in both shortening products, but that in the range of 32–24° C. the rate of temperature drop decreases and there is a change in the slope of the curve. Nevertheless, in the range of 32–24° C., the curve continues downwardly without the formation of a plateau or a temperature rise.

The shortening formulation may be melted and mixed readily with the dried egg powder, the preferred temperatures being 38–65° C., and in the proportion desired for the final use of the shortening-dried egg product. For example, when the shortening-dried egg product is to be employed for the baking of cakes, the proportion of the egg to the shortening may be about 11–46 percent of the dried egg material to about 89–54 percent of the shortening by weight. When whole egg material is used, we prefer to use about 20–25 weight percent of dried egg material to 80–75 weight percent of shortening. Such proportions will, of course, be varied depending upon the intended final use of the shortening-dried egg product.

After mixing the egg and shortening material, the mixture is chilled to about 24–18° C. We then work or plasticize the material in the range of about 32–24° C. The cooling and working may be accomplished in any suitable mechanism; for example, the material may be forced through a slot in a piston within a confined vessel as the piston is reciprocated, such apparatus being known as the Harrington plasticizer. This apparatus is described in JAOCS 36, 539–541 (1959). Such cooling and working may also be effected in a votator or other plasticizing apparatus. The working or plasticizing operation is continued until the crystallized product has become substantially stabilized.

In the Harrington plasticizer, the egg shortening mixture is chilled in the jacketed cooling vessel in which coolant is circulated at a temperature of about 0–1° C. After a short cooling period of about four minutes, more or less, the egg shortening mixture is chilled to the desired range. We plasticize or work the material in the range of about 32–24° C. while circulating coolant at a temperature of about 21° C. through the jacket of the container. The chilling time may be reduced by lowering the temperature of the coolant.

In the Harrington plasticizer, we find that about eight minutes of working is sufficient to produce the stable crystal condition desired. However, such time will vary widely depending upon the type of apparatus employed and other conditions.

After the above-described processing, we temper the product for a period of at least 24 hours, and preferably for about 48 hours or more, at a constant temperature in the range of about 24–38° C. to obtain the final desired product with a crystal structure which remains stable. For commercial use, the product is then ordinarily cooled to the temperature of about 21–27° C., which is the temperature desired by the baker for baking use.

There is a change in color of the shortening-dried egg product occurring in the range of 24–32° C. (preferably 26–31° C.) during the working operation. The change of color is associated with a change in functionality. Shortening-dried egg materials exhibiting a curve differing substantially from those shown in the figures of the drawing usually have a dull yellow-brown color and are low in functionality. The shortening-dried egg product having the curve shown in the figures has a bright, canary-yellow color and is high in functionality. Our observations indicate that in the temperature range of 24–32° C., there is a change in the crystal form of the shortening-dried egg material.

Since crystal transformation is difficult, it is quite likely that many of the crystals are in a transitory state and it is possible that mechanical working can quickly drive the product from one crystal form to another crystal form. Since crystal transformation is an exothermic reaction, the crystal structure which is present at the time could liquefy and even melt because of the heat given off during a crystal transformation. While it is desirous to obtain crystal transformation from a lower to a higher melting form so that a physically stable shortening can be manufactured, so much heat may be liberated which when not removed may destroy through melting most of the structure originally present.

While we cannot state with certainty what occurs during the temperature range above referred to, we believe that in the specific formulations described, the specific triglycerides tend to form small nuclei. The development of small nuclei allows a continuous formation of crystals. The heat of crystallization slows down the cooling rate, but at the same time promotes a continuous transformation of the crystalline product into a more functional crystal form. If these nuclei do not form as the sample cools, a rise in the cooling curve is found. When little or no nucleation occurs, the shortening-dried egg product supercools and does not promote transformation in the product into the desirable, more functional crystal form.

By providing a shortening-dried egg product having the characteristic cooling curve shown in the drawing and by which we eliminate the excess heat of crystalilization, and by working or plasticizing the material during the critical range of 24–32° C. (preferably 26–31° C.) and thereafter tempering in the range of 24–38° C. (preferably about 27° C.), we are able to prepare a shortening-dried egg product which can be reproduced to give uniform functional results and by which dried egg material can be hydrated and mixed with the batter constituents without requiring the tedious prior admixing of egg material with water.

The cooling curve as described in Mehlenbacher (The Analysis of Fats and Oils, 1960, pp. 406, 407) has long been recognized as a useful tool for determining the composition characteristics or polymorphism of fats. The technique is also described in Physical Methods of Organic Chemistry in Technique of Organic SChemistry, vol. 1, Part 1, pp. 298–301. The cooling curve procedure which we prefer to use is to introduce 100 grams of the shortening-dried egg composition into a beaker of the type described as Electrolytic, glass, tall form, 180 ml., and with stirring heat the same to 60° C. The composition is then cooled to 55° C. with rapid stirring and the composition put in a stainless steel cup containing water, the cup being supported in a water bath held at 20° C. At the start of the analysis, the water in the cup and in the bath about the cup have the same temperature. A titer thermometer is supported in the composition and the composition allowed to cool, temperature readings being taken every three minutes or other suitable interval. In a record, the time of readings is plotted against the temperature, the temperature being dropped from 55–23° C.

The egg content of the shortening-dried egg composition has a great influence on the shape of the cooling curve since the egg contains protein, triglycerides, lipoproteins and other surface active ingredients. Since the composition of dried egg material is substantially uniform, a final shortening-dried egg composition having the characteristic curve hereinbefore defined can be obtained by controlling the composition of the added shortening. For natural fats, one can mathematically calculate or chemically determine the composition of the triglyceride types. Such procedure es shown by Vander Wal in Triglyceride Structure (Advances in Lipid Research, vol. 2).

In examples set out hereinafter, we have indicated certain formulations which give the desired or characteriitic curve of the shortening-dried egg material and which give the shortening-dried egg material desirable physical characteristics. These formulations may be varied readily by workers in this field employing known information as to the added shortening material. For example, in a specific formulation, if the cooling curve determination shows a sudden rise in the critical range of 32–24° C., this indicates that there is in the product too much of a single component which has solidified and has given off heat. The worker will therefore reduce the amount of this component. For example, the component giving such temperature rise may be a flake material and this component will therefore be reduced in the formulation. On the other hand, if the leveling out of the curve is at too low a temperature, for example, below the range of 32–24° C., the worker will add to the formulation at triglyceride high in disaturate material or a material which acts as though it were high in disaturates, such as, by way of example, soybean oil having an iodine value of 70.

From the foregoing, it will be seen that by using the recognized tool of a cooling curve in preparing the formulations and the known information about the added fats, the shortening-dried egg material can be readily prepared, satisfying the cooling curve requirement and thus enabling the product to be reproduced to give uniform functional results.

Specific examples illustrative of the invention may be set out as follows:

EXAMPLE I

A shortening-dried egg product having the following specific meat fat shortening formula was prepared, plasticized, and tempered to provide a uniform functionally performing product:

TABLE I

| | Percent |
|---|---|
| Lard flakes | 0.3 |
| Tallow flakes | 0.7 |
| Lard | 38.4 |
| Tallow | 37.7 |
| Hydrogenated lard (I.V. 58) | 22.9 |

77.5% of the above shortening formula is mixed with 22.5% spray dried whole eggs.

The above formula gave the cooling curve with the desired temperature drop, and a decreased rate of drop in the 28.0° C. to 26.5° C. area with no temperature rise.

The lard flakes had an iodine value of 1.29; the tallow flakes had an iodine value of 0.42; the lard had an iodine value of 65.0; the tallow had an iodine value of 44.2; and the hydrogenated lard had an iodine value of 58.0.

The chilling and working were carring on in a Harrington plasticizer. By working the shortening-dried egg product for 4 minutes, using cooling water in the jacket of 0–1° C. followed by working for a period of 8 minutes with warm water at 21° C. in the jacket, it was found that the product had good physical consistency, functional stability, and had a bright yellow appearance.

After plasticizing under several conditions and tempering for 48 hours under different temperatures, the following data was obtained.

TABLE II

| | | | | | |
|---|---|---|---|---|---|
| Chill time (jacket temp. 0–1° C.), min | 4 | 4 | 4 | 4 | 4 |
| Working (jacket temp.), ° C | | 18 | 21 | 21 | 27 |
| Working time, min | | 4 | 8 | 12 | 8 |
| Temperature out plasticizer, ° C | 23 | 27 | 28 | 29.5 | 25.5 |

| Tempering temperature (48 hours): | Pound cake volume, cc./100 gm. | | | | |
|---|---|---|---|---|---|
| 24° C | | 237 | 242 | 247 | 242 |
| 27° C | | 248 | 248 | 250 | 245 |
| 29.5° C | | | 240 | | |
| 32° C | 264 | | 237 | | |
| 35° C | | | 233 | | |

By tempering at 27° C. for 48 hours, a functional product was produced which had a bright yellow appearance, had good plasticity (works in the batter easily and uniformly), and had a fine texture.

In making the tests with respect to cake volume, the following procedure and formula for pound cakes were employed:

All cakes are mixed in a Hobart N–50 using a paddle:

50 revolutions at low speed
200 revolutions at medium speed, scrape down
300 revolutions at medium speed Batter weights are recorded by a 212 cc. cup.

CONTROL FORMULA 1 lb. cake flour
11 oz. shortening
1 lb., 3½ oz. granulated sugar
½ oz. salt
1 oz. NFDM
3 oz. whole egg solids
15 oz. water (22° C.)

TEST FORMULA 1 lb. cake flour
14 oz. egg shortening product
1 lb., 3½ oz. granulated sugar
½ oz. salt
1 oz. NFDM
15 oz. water (22° C.)

Note:
(a) when liquid egg is used
    11 oz. shortening
    11 oz. liquid eggs
    7 oz. water
(b) All cakes are scaled 1 lb. and baked about 55 minutes at 178° C.

In the cake volume tests, it should be noted that the procedure employs two ounces of batter less than the amount ordinarily used in making cake volume tests, and yet, with the reduced amount of batter, cake volumes of 250 cc. per 100 grams were obtained, as indicated in Table II:

TABLE III

[Data to demonstrate functional reproducibility of formula shown in Table I]

| | Cake volume (cc./100 gm.), tempering temperature | | | | | Minutes | |
|---|---|---|---|---|---|---|---|
| | 35° C. | 32° C. | 29.5° C. | 27° C. | 24° C. | Cooled at 0° C. | Cooled at 21° C. |
| Test No.: | | | | | | | |
| 1 | 264 | | | | | 4 | |
| 2 | 233 | 237 | | | | 4 | 8 |
| 3 | 228 | 234 | | | | 4 | 8 |
| 4 | 232 | 238 | | | | 4 | 8 |
| 5 | | | 240 | 248 | | 4 | 8 |
| 6 | | | 235 | 242 | | 4 | 8 |
| 7 | | | 236 | 251 | | 4 | 8 |
| 8 | | | | 248 | 242 | 4 | 8 |
| 9 | | 239 | | 247 | | 4 | 8 |
| 10 | | | | 245 | 235 | 4 | 8 |
| 11 | | | | 244 | 237 | 4 | 8 |
| 12 | | | | 250 | 245 | 4 | 12 |
| 13 | | | | 252 | | 4 | 8 |
| 14 | | 244 | | 248 | | 4 | 9 |
| 15 | | | | 254 | | 4 | 8 |
| 16 | | 246 | | 252 | | 4 | 8 |
| 17 | | 240 | | 240 | | 4 | 8 |

The shortening-dried egg product described in Table I was successfully used in pound cakes, doughnuts, cake-type cookies, non-emulsified shortening layer cake (105 percent sugar to 140 percent sugar), and pancakes. The product compared favorably in volume, symmetry, and overall quality with a conventionally-tempered shortening and using fresh frozen, unpasteurized eggs. The product also compares favorably with a commercial, conventionally-tempered, non-emulsified vegetable shortening and fresh frozen, unpasteurized eggs in the above baking applications.

EXAMPLE II

A formulation was prepared and combined with 22.5 percent spray dried whole eggs, the formula and conditions being as follows:

TABLE IV

Formula:
    80% lard
    20% tallow

Hydrogenate lard and tallow at 15 p.s.i.g., 190° C. max. with 0.04% Ni (Ruferts) to a refractive index of 9.48 (45° C.)

To this hydrogenated shortening is added 3% tallow flakes

The processing of the shortening-dried egg product was carried out as described in Example I with comparable results.

EXAMPLE III

The formula described in Example I, Table I was employed in experiments carried on in a continuous pilot plant votator. It was found that a functional shortening-dried egg product using Formula I was successfully made with the votator, the product being tempered at 32° C. to achieve the best functionality. The following table sets out the votating conditions and results:

TABLE V

| B-I cooling water | | Shortening temperature | | | | Batter weight (pound cake) temper temperatures | | | | | Temper time hours |
|---|---|---|---|---|---|---|---|---|---|---|---|
| In | Out, °C. | In A unit, °C. | Out A unit, °C. | Out, BI, °C. | Out, BII, °C. | No temper | 24 | 27 | 29.5 | 32 | |
| None | None | 52 | 21 | 24.5 | 28 | 218 | | | | | 0 |
| | | | | | | | 198 | | | | 24 |
| | | | | | | | | 193 | | | 48 |
| 25.5° C | 24.5 | 48.5 | 24.5 | 27 | 29.5 | 221 | | | | | 0 |
| | | | | | | | 207 | 210 | 190 | 164 | 24 |
| | | | | | | | 199 | 204 | 169 | 159 | 48 |
| 24.5° C | | 29 | 46 | 21 | 25 | 29 | 217 | | | | 0 |
| | | | | | | | 206 | 206 | 178 | 162 | 24 |
| | | | | | | | 205 | 197 | 163 | 157 | 48 |

The lower the batter weight the greater will be the pound cake volume.

EXAMPLE IV

A shortening-dried egg product was made from vegetable fats employing the following formula:

TABLE VI 13.4% hydrogenated soybean oil, 70.8 iodine value
80.3% hydrogenated soybean oil, 84.3 iodine value
6.3% cottonseed flakes 22.5% of spray dried whole eggs was combined with 77.5% of shortening having the above formula.

The cottonseed flakes had an iodine value of 3.2. The cooling curve of the dried egg shortening product is set out in FIG. 2 of the drawing. The cooling curve data for the vegetable oil shortening-dried egg product described in Table V is set out in Table VII:

TABLE VII

| Time in minutes: | Temperature ° C. |
|---|---|
| 0 | 55.0 |
| 3 | 53.2 |
| 6 | 46.8 |
| 9 | 42.2 |
| 12 | 38.2 |
| 15 | 35.1 |
| 18 | 33.2 |
| 21 | 31.8 |
| 24 | 30.9 |
| 27 | 30.4 |
| 30 | 30.1 |
| 33 | 29.9 |
| 36 | 29.2 |
| 39 | 28.3 |
| 42 | 27.6 |
| 45 | 26.7 |
| 48 | |
| 51 | |

A shortening-dried egg product as described in Table VI was processed as described in Example I.

In Table VIII is shown the pound cake volumes for the shortening-dried egg product which shows that a vegetable fat based shortening-dried egg product will perform as well as a meat fat based shortening-dried egg product.

TABLE VIII

| Temper temperature (48 hrs.) ° C. | Pound cake volume, cc./100 grams |
|---|---|
| 27 | 261 |
| 29.5 | 257 |

EXAMPLE V

Freshly spray dried whole egg (3 hours old) was incorporated in a shortening as described in Example I, votated and tempered at 29.5° C. for 72 hours, then cooled and stored at 21° C. Baking tests as described in Example I showed excellent results. In addition, a portion of the product was tempered at 32° C., and the shortening product gave pound cake volumes in the 269–279 cc. per 100 gram range.

EXAMPLE VI

The process is carried out as described in Example I except that dried yolks are used instead of dried whole egg material.

EXAMPLE VII

The process is carried out as described in Example I except that instead of dried whole eggs, dehydrated egg whites are used, the level of egg whites being 11.8 percent. The product is useful particularly in the preparation of white layer cake.

EXAMPLE VIII

The process was carried out as described in Example II except that the shortening comprising 77.5 percent contained 5 weight percent of a mono- and diglyceride emulsifier. The processing was as described in Example I, tempering being carried on at 32° C. An average cake volume of 273 was obtained.

It will be understood that emulsifiers of various types may be employed and that the formula will be modified depending upon the character of the emulsifier.

While in the foregoing specification we have set out procedure in considerable detail for the purpose of illustrating modifications of the invention, it will be understood that such details may be varied widely by those skilled in the art without departing from the spirit of our invention.

We claim:

1. In a process for preparing a shortening dehydrated egg product, the steps of mixing particulate dehydrated egg material with a melted fat shortening which when mixed exhibits a cooling curve showing a continuous fall in temperature with a decreased rate of drop in temperature in the range of about 32–24° C. and with the drop in such range unbroken by plateaus and temperature rises in excess of 1° C., cooling said shortening and egg mixture to a temperature of about 18–24° C., working said mixture while the temperature rises to about 24–32° C., and tempering said mixture at a substantially constant temperature in the range of 24–38° C. for a period in excess of 24 hours.

2. The process of claim 1 in which the egg material consists of dried whole eggs.

3. The process of claim 1 in which the tempering is continued in the range of about 24–38° C. for about 48 hours.

4. The process of claim 1 in which the proportion of the egg to shortening is about 11–46 percent of the dried egg material to about 89–54 percent of the shortening by weight.

5. The process of claim 1 in which the egg material is whole egg and the proportion of egg to shortening is about 20–25 percent of the dried egg material to 80–75 percent of the shortening by weight.

6. The process of claim 1 in which an emulsifier is added.

7. The process of claim 1 in which the shortening is an animal fat shortening.

8. The process of claim 1 in which the shortening is a vegetable shortening.

9. In a process for preparing a shortening dehydrated whole egg product, the steps of mixing spray dried whole egg material with a melted fat shortening which when mixed exhibits a cooling curve showing a continuous fall in temperature with a decreased rate of drop in temperature in the range of 32–24° C. and with the drop in such range unbroken by plateaus and temperature rises in excess of 1° C., cooling said egg and shortening mixture to 18–24° C., working said mixture during which the temperature increases to about 26–32° C., and tempering said mixture at a substantially constant temperature in the range of 24–38° C. for a period in excess of 24 hours.

10. The process of claim 9 in which said mixture is cooled rapidly into said range of 18–24° C. using cooling water in the range of 0–1° C. for four minutes, and then working said mixture at a temperature of 24–32° C., employing cooling water at a tempearture of about 21° C. for about eight minutes, and then tempering the mixture at a substantially constant temperature in the range of about 24–38° C. under quiescent conditions for a period of about 48 hours.

11. The process of claim 10 in which said working of the mixture in the range of 26–31° C. is carried on until the product has a bright, canary-yellow color.

12. The process of claim 10 in which said mixture is cooled by employing a coolant fluid during the working period.

13. A product prepared by the process described in claim 1.

References Cited
UNITED STATES PATENTS

| | | | |
|---|---|---|---|
| 2,479,310 | 8/1949 | Chapin | 99—113X |
| 2,801,177 | 7/1957 | Lutton | 99—118 |

FOREIGN PATENTS

| | | | |
|---|---|---|---|
| 19,512 | 8/1910 | Great Britain | 99—113 |
| 499,059 | 1/1939 | Great Britain | 99—113 |

JOSEPH M. GOLIAN, Primary Examiner

U.S. Cl. X.R.

99—118, 92

UNITED STATES PATENT OFFICE
CERTIFICATE OF CORRECTION

Patent No. 3561979        Dated February 9, 1971

Inventor(s) Pontius, Endres and Van Akkeren

It is certified that error appears in the above-identified patent and that said Letters Patent are hereby corrected as shown below:

Col 1 line 50

[shortening protects the dried egg from and flavor deterio ahould read - "shortening protects the dried egg from color and flavor deterio -"

Signed and sealed this 24th day of August 1971.

(SEAL)
Attest:

EDWARD M. FLETCHER, JR.        WILLIAM E. SCHUYLER, JR.
Attesting Officer                 Commissioner of Patents